US 6,748,790 B2

(12) United States Patent
Abbe

(10) Patent No.: US 6,748,790 B2
(45) Date of Patent: Jun. 15, 2004

(54) METHOD OF CALIBRATING MEASURING MACHINES

(75) Inventor: Makoto Abbe, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/206,373

(22) Filed: Jul. 29, 2002

(65) Prior Publication Data

US 2002/0189319 A1 Dec. 19, 2002

Related U.S. Application Data

(62) Division of application No. 10/083,375, filed on Feb. 27, 2002, now Pat. No. 6,640,607.

(30) Foreign Application Priority Data

Mar. 2, 2001 (JP) .......................................... 2001-58916
Feb. 22, 2002 (JP) .......................................... 2002-46618

(51) Int. Cl.[7] .............................................. G01B 21/00
(52) U.S. Cl. ........................................................ 73/1.79
(58) Field of Search ............................... 73/1.01, 1.79, 73/1.81; 33/503, 504

(56) References Cited

U.S. PATENT DOCUMENTS

| | | | | |
|---|---|---|---|---|
| 4,819,195 A | | 4/1989 | Bell et al. | |
| 4,841,762 A | * | 6/1989 | Hunter | 700/254 |
| 4,875,177 A | | 10/1989 | Jarman | 364/559 |
| 4,884,889 A | | 12/1989 | Beckwith, Jr. | |
| 4,932,131 A | * | 6/1990 | McMurtry et al. | 33/1 M |
| 4,939,678 A | | 7/1990 | Beckwith, Jr. | |
| 4,945,501 A | | 7/1990 | Bell et al. | |
| 5,125,261 A | * | 6/1992 | Powley | 73/1.81 |
| 5,189,806 A | * | 3/1993 | McMurtry et al. | 33/503 |
| 6,519,860 B1 | * | 2/2003 | Bieg et al. | 33/503 |

FOREIGN PATENT DOCUMENTS

| | | | |
|---|---|---|---|
| JP | A 2001-311618 | | 11/2001 |
| JP | A 2001-330428 | | 11/2001 |

* cited by examiner

*Primary Examiner*—Hezron Williams
*Assistant Examiner*—Charles D. Garber
(74) *Attorney, Agent, or Firm*—Oliff & Berridge, PLC

(57) ABSTRACT

A reference device having a sphere positioned within a measurement space by an object three-dimensional measuring machine having a spherical probe contacting the spherical probe with six or more measurement points uniformly distributed on the spherical surface of the sphere to measure central coordinates of the sphere of the reference device by the object three-dimensional measuring machine and calibrating the object three-dimensional measuring machine based on the central coordinates obtained.

5 Claims, 15 Drawing Sheets

EQUALLY ARRANGED 6-POINT MEASUREMENT STRATEGY

FIG. 3

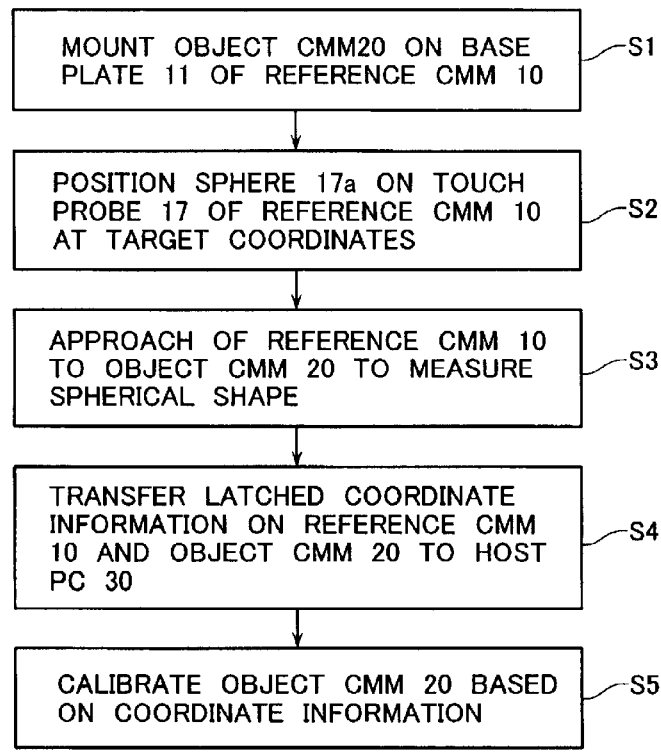

- MOUNT OBJECT CMM20 ON BASE PLATE 11 OF REFERENCE CMM 10 — S1
- POSITION SPHERE 17a ON TOUCH PROBE 17 OF REFERENCE CMM 10 AT TARGET COORDINATES — S2
- APPROACH OF REFERENCE CMM 10 TO OBJECT CMM 20 TO MEASURE SPHERICAL SHAPE — S3
- TRANSFER LATCHED COORDINATE INFORMATION ON REFERENCE CMM 10 AND OBJECT CMM 20 TO HOST PC 30 — S4
- CALIBRATE OBJECT CMM 20 BASED ON COORDINATE INFORMATION — S5

FIG. 4

|  | Ref.CMM | Obj.CMM | UNIT |
|---|---|---|---|
| MAXIMUM MEASURABLE SIZE | 800 × 1500 × 600 | 500 × 400 × 400 | mm$^3$ |
| RESOLUTION | 0.1 | 0.5 | $\mu$m |
| MEASURABLE PRECISION | 2.0+2.0/1000 × L[mm] $\leq$ 3.0 | 2.9+4.0/1000 × L[mm] | $\mu$m |

5-POINT MEASUREMENT
STRATEGY

EQUALLY ARRANGED 6-POINT
MEASUREMENT STRATEGY

IF $r_1 + d_2/2 \leq r_2 + d_1/2$

IF $r_1 + d_2/2 > r_2 + d_1/2$

FIG. 8A | FIG. 8B | FIG. 8C
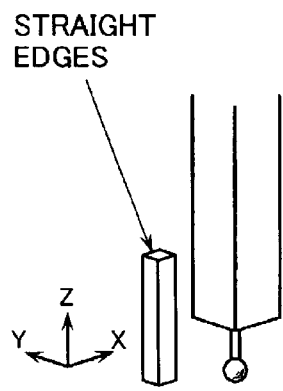
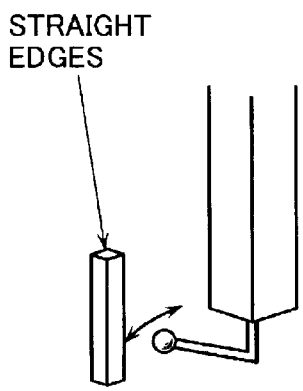
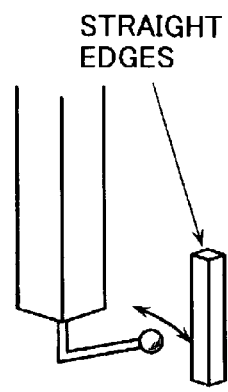
FIG. 9
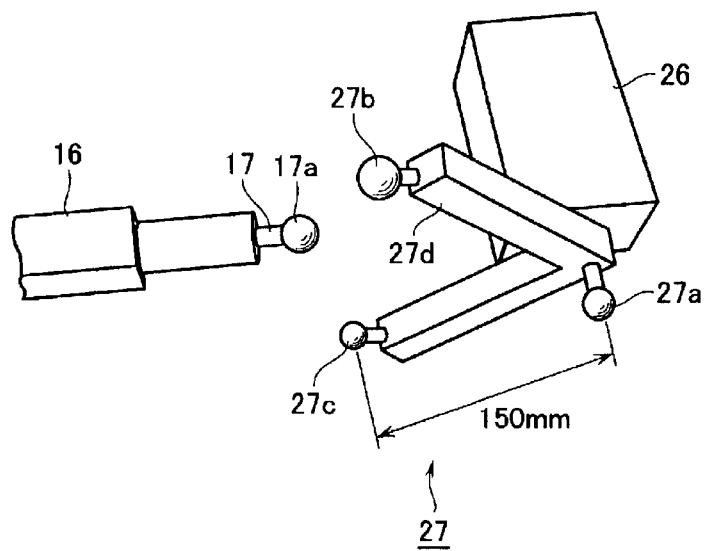

STEP GAUGE

COORDINATE COMPARISON

FIG. 12
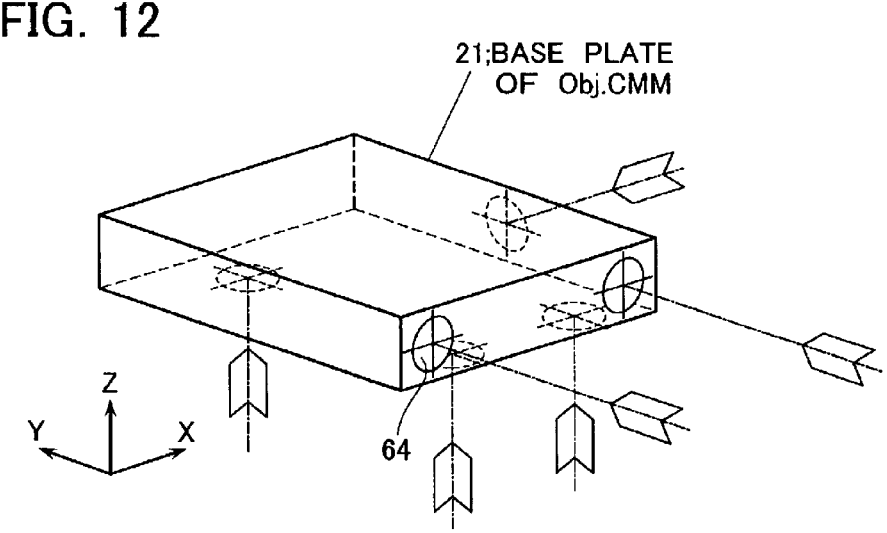
FIG. 14A  FIG. 14B  FIG. 14C
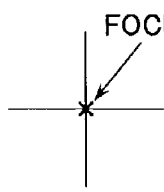
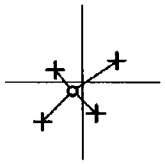
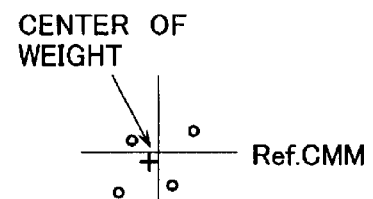
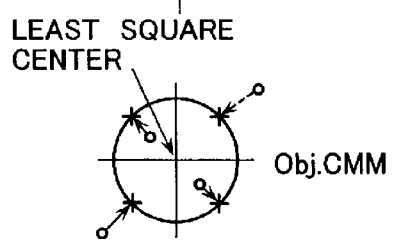
IDEAL CASE   REAL CASE   SOLUTION BY MOVEMENT

METHOD OF CALIBRATING MEASURING MACHINES

This application is a division of U.S. patent application Ser. No. 10/083,375 filed Feb. 27, 2002 now U.S. Pat. No. 6,640,607.

CROSS REFERENCE TO RELATED APPLICATION

This application claims benefit of priority under 35USC § 119 to Japanese Patent Application No. 2001-58916, filed on Mar. 2, 2001, and No. 2002-46618, filed on Feb. 22, 2002, the entire contents of which are incorporated by reference herein.

BACKGROUND OF THE INVENTION

1. Field of the Invention

The present invention relates to a method for calibrating measuring machines and more particularly to a method and apparatus suitable for calibrating surface texture measuring machines such as three-dimensional measuring machines and the like.

2. Description of the Related Art

A three-dimensional measuring machine for measuring a three-dimensional shape of a work; a contour measuring machine and an image measuring machine for measuring a two-dimensional contour; a roundness measuring machine for measuring roundness; and a surface roughness measuring machine for measuring waviness and roughness of a work surface have been known as surface texture measuring machines that can be employed to measure surface shapes of works, such as contour, roughness and waviness. These machines are generally equipped with a guide mechanism for moving a contact or non-contact sensor relative to a work in one- or multi-axial arrangement.

These guide mechanisms commonly include a guide, an feed screw and a nut for mating with the screw to move a slider that is coupled to the nut. A linear scale is employed, for example, to measure a movement of the slider. There is another type of guide mechanism that is not always equipped with an feed screw but consists only of a guide and a slider. This guide mechanism employs a linear scale to read an amount of displacement of the slider manually moved. The slider is commonly provided with a sensor such as a touch probe and a CCD camera attached thereon.

Environmental pollution, environmental variation-related deformations and other errors are inevitably caused in these guide mechanisms. As a result, the slider can not move correctly and may give errors in data measured from a work by the sensor located on the slider.

For example, of the above guide mechanisms, in a straight guide mechanism designed for the purpose of straight movement, various errors can be considered: a straightness error in a vertical plane; a straightness error in a horizontal plane; a pitching error; a rolling error; a yawing error; and an indication error on the linear scale itself.

Of the surface texture measuring machines, as a three-dimensional Coordinate Measuring Machine (hereinafter referred to as CMM) has a structure that includes three sets of such straight guide mechanisms intersecting at right angles with each other, orthogonal errors occur between the straight guide mechanisms additionally. Therefore, at least 21 types of geometrical deviations in total may possibly occur in such the CMM.

As a result, a great effort is required disadvantageously in an operation to strictly calibrate such the surface texture measuring machines.

For example, a measuring machine designed for the purpose of calibrating a geometrical deviation of the CMM is currently limited from the viewpoint of the variety of measurement methods while it has been employed long in history. In many cases, the mainstream is a measurement instrument for mono-functionally detecting a geometrical deviation, for example, a laser interferometer and an electrical level. To manage uncertainty in measurement using the measuring machines, it is required to handle the machine and perform alignment prior to every measurement by an operation-learned operator. As a result, it is required to perform calibration by a skilled worker spending many hours, resulting in a high-cost, labor-intensive work step that can not expect a saving in labor. On the other hand, when the geometric accuracy by the current CMM is standardized within its operable range, it has already reached several ppm. Thus, it is difficult to realize such a calibration method that can be satisfied from the viewpoint of uncertainty in view of simply trying automation.

Reflecting the recent high concerns on traceability and uncertainty in calibration, a trend can be found in an offer of a geometric calibration to the user for an appropriate market price and quality. In such the case, it can not be expected to ensure a calibrating operator with extremely high techniques. Even if it can be expected, the user's satisfaction from the viewpoint of cost remains low. More importantly, the geometric calibration in the market aims at an additional calibration, which is performed to a measuring machine already calibrated generally by the maker using some method, to issue an official certificate of calibration on uncertainty in calibration. Therefore, in the case of the CMM, it is not required to measure a measurement space including everything. In addition, it is possible to evaluate at a considerably long interval between measurement points. With this regard, it has a characteristic of the sampling test.

To the contrary, the calibration in the process of manufacturing CMMs has a different property from that in the market. First, as the object is a CMM that is not calibrated previously in history, it is required to locate measurement points that can cover the whole measurement space at a necessarily and sufficiently fine interval. This corresponds to a 100% and full-function inspection. In addition, a premise lies in compensating the geometric deviation of CMM using the calibration result. Therefore, it is required to adopt a calibration method that provides a calibrated value as the geometric deviation kinematically described usable for compensation of precision. Due to such the property, the dependency on the learned worker is particularly higher compared to the commercial calibration laboratory, presenting a high barrier against saving in labor.

SUMMARY OF THE INVENTION

The present invention has been made to solve the above disadvantages and accordingly has an object to provide a calibration method capable of increasing precision of spherical parameter assumption to improve precision of calibration.

To achieve the above object, the present invention is provided with a first calibration method, comprising the steps of: positioning a reference device having a sphere within a measurement space by an object three-dimensional measuring machine having a spherical probe; contacting the spherical probe with six or more measurement points uniformly distributed on the spherical surface of the sphere to measure central coordinates of the sphere of the reference device by the object three-dimensional measuring machine;

and calibrating the object three-dimensional measuring machine based on the central coordinates obtained.

The present invention is provided with a second calibration method, comprising the steps of: positioning a reference three-dimensional measuring machine having a first probing system previously calibrated and an object three-dimensional measuring machine having a second probing system to be calibrated in such a manner that a measurement space by the three-dimensional reference measuring machine is superimposed on a measurement space by the object three-dimensional measuring machine, locating a spherical probe on one of the first and second probing systems and locating a reference device having a sphere on the other of the first and second probing systems; contacting the spherical probe with six or more measurement points uniformly distributed on the spherical surface of the sphere of the reference device to acquire first measurement values by the reference three-dimensional measuring machine and second measurement values by the object three-dimensional measuring machine; and calibrating the object three-dimensional measuring machine based on the first and second measurement values.

According to the present invention, six or more points uniformly distributed on the spherical surface of the sphere provided on the reference device are employed as measurement points to assume parameters of the sphere. Therefore, it is possible to obtain highly reliable data with improved "uncertainty in measurement" that are isotropic in X, Y and Z directions and not correlated with each other.

BRIEF DESCRIPTION OF THE DRAWINGS

The present invention will be more fully understood from the following detailed description with reference to the accompanying drawings in which:

FIG. 3 is a flowchart showing a calibration method in the calibration system according to the same embodiment;

FIG. 4 shows brief specifications of a reference CMM and an object CMM;

FIGS. 8A, 8B and 8C illustrate setting of probe vectors;

FIG. 9 shows a reference device for providing three different probe vectors not arrayed in line within a three-dimensional space to obtain 21 sets of parametric errors in an orthogonal CMM;

FIG. 12 schematically shows a detection method locating six channels of differential-transformer type displacement gauges;

FIGS. 14A, 14B and 14C are two-dimensional schematics for illustrating influences from positioning deviations;

DETAILED DESCRIPTION OF THE PREFERRED EMBODIMENTS

Figure 1:
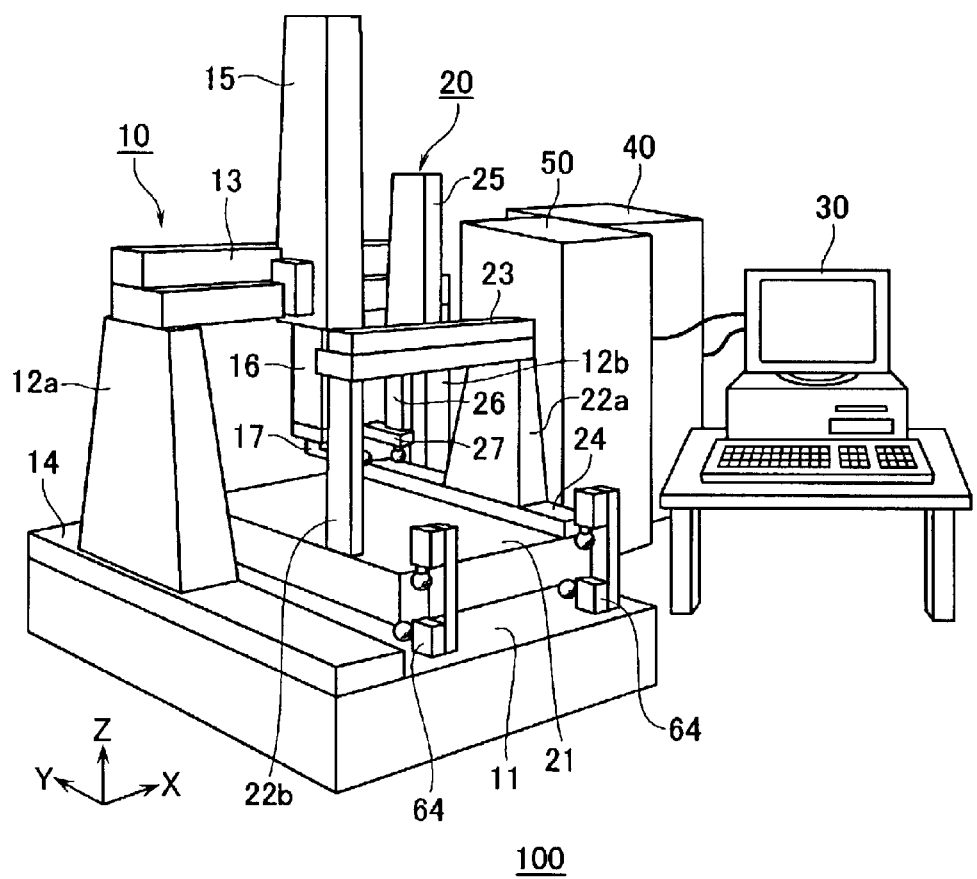
FIG. 1 is a perspective view according to a first embodiment of the present invention showing the appearance of a calibration system 100 capable of directly comparing and measuring coordinate indication values from two CMMs.

Preferred embodiments of the present invention will be described below with the use of the drawings. The same reference numerals are employed to denote the same parts through the whole drawings.

FIG. 1 shows the appearance of a calibration system 100 according to a first embodiment capable of directly comparing and measuring coordinate indication values from two CMMs.

The calibration system 100 comprises a reference CMM 10 that has a measurement space for therein locating an object CMM 20 to be calibrated. To control the reference CMM 10 and the object CMM 20 respectively and collect coordinate information from them, CMM controllers 40, 50 are provided. Through the controllers 40, 50, the coordinate information are supplied into a host computer (host PC) 30, which serves as computing means to calibrate the object CMM 20 using the coordinate information obtained from the reference CMM 10 (the second coordinate information).

The object CMM 20 is of a moving bridge type, for example. A beam 23 extends in the x-axis direction and is supported on the upper ends of beam supports 22a, 22b that stand from both side edges of a first base plate 21 for mounting a work thereon. The beam support 22a is held at the lower end movably in the y-axis direction by a y-axis drive mechanism 24. The beam support 22b is held at the lower end movably in the y-axis direction on the base plate 21 by an air bearing. The beam 23 supports a column 25 that extends in the z-axis direction (the vertical direction). The column 25 is driven in the x-axis direction along the beam 23. The column 25 is provided with a spindle 26 that can be driven in the z-axis direction along the column 25. A reference device 27 is mounted on the lower end of the spindle 26.

The reference CMM 10 is also of a moving bridge type, for example, and comprises a second base plate 11 having a sufficient size to mount the object CMM 20 thereon. A beam 13 extends in the x-axis direction and is supported on the upper ends of beam supports 12a, 12b that stand from both side edges of the base plate 11. The beam support 12a is held at the lower end movably in the y-axis direction by a y-axis drive mechanism 14. The beam support 12b is held at the lower end movably in the y-axis direction on the base plate 11 by an air bearing. The beam 13 supports a column 15 that extends in the z-axis direction (the vertical direction). The column 15 is driven in the x-axis direction along the beam 13. The column 15 is provided with a spindle 16 that can be driven in the z-axis direction along the column 15. A contact probe 17 is mounted on the lower end of the spindle 16.

Figure 2:
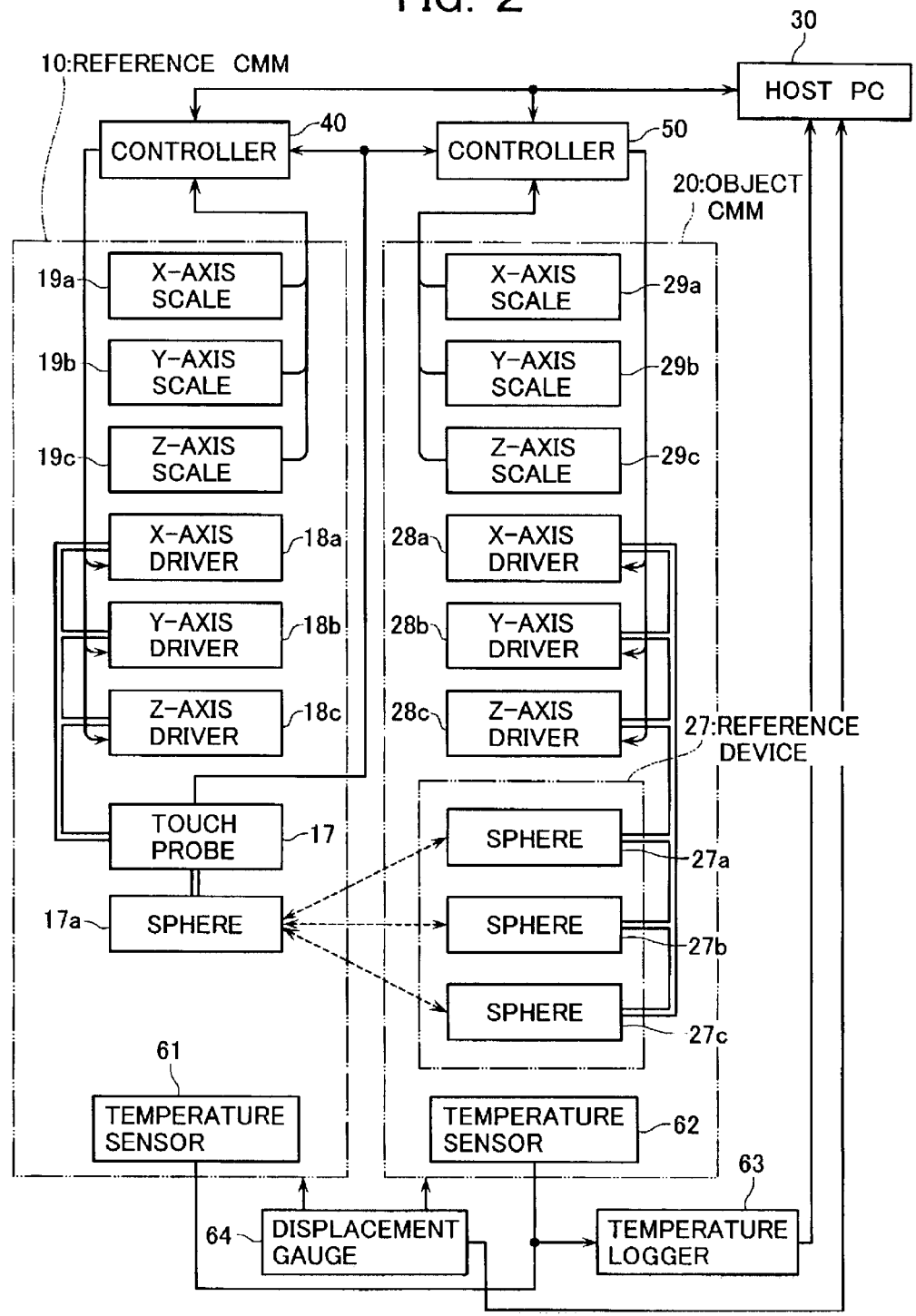
FIG. 2 is a block diagram showing an arrangement of the calibration system according to the same embodiment.

FIG. 2 is a block diagram showing an internal arrangement of the calibration system 100. The reference CMM 10 is provided with an x-axis driver 18a for driving the column 15 in the x-axis direction, a y-axis driver 18b for driving the beam 13 in the y-axis direction, and a z-axis driver 18c for driving the spindle 16 in the z-axis direction, based on a respective drive control command for each axis given from the controller 40. The reference CMM 10 is also provided with an x-axis scale 19a for supplying x-axis coordinate information that indicates a location of the column 15 in the x-axis direction, a y-axis scale 19b for supplying y-axis coordinate information that indicates a location of the beam 13 in the y-axis direction, and a z-axis scale 19c for supplying z-axis coordinate information that indicates a location of the spindle 16 in the z-axis direction. On the other hand, the object CMM 20 is similarly provided with an x-axis driver 28a for driving the column 25 in the x-axis direction, a y-axis driver 28b for driving the beam 23 in the y-axis direction, and a z-axis driver 28c for driving the spindle 26 in the z-axis direction, based on a respective drive control command for each axis given from the controller 50. The object CMM 20 is also provided with an x-axis scale 29a for supplying x-axis coordinate information that indicates a location of the column 25 in the x-axis direction, a y-axis scale 29b for supplying y-axis coordinate information that indicates a location of the beam 23 in the y-axis direction, and a z-axis scale 29c for supplying z-axis coordinate information that indicates a location of the spindle 26 in the z-axis direction.

In this case, with respect to the x-axis, the beams 23 and 13 respectively correspond to the first and second guides, the columns 25 and 15 to the first and second sliders, and the x-axis scales 29a and 19a to the first and second scales. With respect to the y-axis, the y-axis drive mechanisms 24 and 14 respectively correspond to the first and second guides, the beams 23 and 13 to the first and second sliders, and the y-axis scales 29b and 19b to the first and second scales. With respect to the z-axis, the columns 25 and 15 respectively correspond to the first and second guides, the spindles 26 and 16 to the first and second sliders, and the z-axis scales 29c and 19c to the first and second scales.

This calibration system 100 employs probing systems to detect a position of the object CMM 20 relative to the reference CMM 10.

There are two types of probing systems. One is of a touch signal probe (touch probe) that generates a trigger signal to latch a counter in a CMM at the instance when a probe sphere contacts an object to be measured. The other is of a scanning probe that includes a three-dimensional displacement measurement system inside. Although either of the probing systems can be employed in the present invention, a touch probe 17 is applied to this embodiment. Because it is inexpensive and easy to control and handle the CMM system and because a sufficient throughput can be expected on a discrete measurement. A touch probe signal output from the touch probe 17 of the reference CMM 10 is split into two and given to two CMM controllers 40, 50 as trigger signals for measurement. The touch signal probe 17 employs a spherical probe having a sphere 17a at the tip. To the reference device 27 that is secured on the lower end of the spindle 26 in the object CMM 20, three spheres 27a, 27b and 27c described later are attached. The probe 17 is employed to measure spherical shapes of these spheres 27a, 27b and 27c.

In order to detect and compensate systematic error factors associated with measurement, outputs from temperature sensors 61, 62 attached to respective axes of the CMMs 10, 20 are sampled as requires via a temperature logger 63. A differential-transformer type displacement sensor 64 is provided to detect fine fluctuations on a location of one of two CMMs 10, 20 relative to the other.

A personal computer serves as the host PC 30. This host PC is operable to drive and position two CMMs 10 and 20, process measurement signals and sensor signals, and assume parametric errors following to the measurement.

FIG. 3 is a flowchart showing a calibration procedure executed by the calibration system 100 according to the embodiment. On the base plate (measurement table) 11 of the larger CMM (Ref. CMM) 10 already calibrated, the smaller object CMM (Obj. CMM) 20 to be calibrated is positioned (S1). In this state, a measurement can be executed in accordance with the following procedure.

First, the sphere 17a attached on the touch probe 17 of the reference CMM 10 is positioned on the target coordinates in accordance with the measurement strategy (previously determined measurement procedure) (S2). Next, the spheres 27a–27b fixed on the tip of the z-axis spindle 26 of the object CMM 20 are moved to approach the sphere 17a of the reference CMM 10 to measure spherical shapes of the spheres 27a–17c (S3). The touch signal is fed from the touch probe 17 to two CMM controllers 40 and 50, which latch coordinate information from the scales 19a–19c and 29a–29c, respectively, using the common touch signal as each trigger signal. The controllers 40 and 50 transfer the latched coordinate information to the host PC 30 (S4). The host PC 30 calibrates the object CMM 20 based on the coordinate information output from the object CMM 20 and the reference CMM 10 (S5). In this measurement method, the object CMM 20 supporting the fixed spheres 27a–27c approaches the reference CMM 10 supporting the touch probe 17. This is opposite to the normal coordinate measurement application, though error factors contributing to the obtained measurement values and their contents by both methods are identical.

In contrast to the above, the spheres 27a–27c of the object CMM 20 may be positioned first in accordance with the measurement strategy and then the sphere 17a of the reference CMM 10 may be approached to the spheres 27a–27c to measure spherical shapes.

(1) Specifications of Reference CMM and Object CMM

Specifications of the reference CMM 10 and the object CMM 20 are briefly shown in FIG. 4. A movement of the bridge of the moving bridge type is defined as the y-axis; a movement of the upper part of the bridge, left to right in the figure, as the x-axis; and a movement in the vertical direction as the z-axis. The object CMM of this type has the currently most popular moving bridge structure and belongs to a widespread price zone among CNC-driven type CMMs. Manufactures have intensive desires for reducing production costs while keeping quality on precision. Therefore, it is an optimal target to apply a comparative measurement method for spatial coordinates.

Requirements for the reference CMM 10 include the following items: uncertainty in measurement; economics including maintenance; and the presence of a measurable range capable of covering a measurement range by the object CMM 20. One of main factors that determine these items is a kinematic arrangement of a CMM. Kinematic arrangements of CMMs are classified into several types. If both the reference CMM 10 and the object CMM 20 are designed of the moving bridge type, it is required to select two machine types so that the maximum width of the object CMM 20 can be contained within the measurement range by the reference CMM 10. This limitation leads to a selection of a reference CMM 10 that is relatively larger than the size of the object CMM 20.

As obvious from FIG. 4, the uncertainty in measurement by the reference CMM to be selected is not too good uncertainty to neglect its contribution, relative to the uncertainty of the object CMM. In calibration of a length, such a calibration reference is normally employed that has a performance as high as about ⅕ of that of the object machine. In consideration of a comparative measurement for the coordinate indication values from CMMs, it is not economically advantageous to refer to the CMM having a performance as high as about ⅕ of that of the object CMM 20 and covering the measurement range by the object CMM 20. In the example of selecting CMMs herein performed, a ratio of uncertainty of the reference CMM 10 to that of the object CMM 20 is about 1:2. ISO GUM 1995 (Guide to the expression of Uncertainty in Measurement) notes that, if uncertainty in calibration and measurement can be quantified statistically, no rationality can be admitted in a concept that the uncertainty of the reference should be extremely smaller than that of the object machine.

(2) Comparative Measurement of Spatial Coordinates

In general, a CMM employs a probe attached thereon, which is sensitive in three spatial directions. Therefore, its essential measured value is considered as a position vector in a three-dimensional space, or a coordinate indication value.

To perform a comparative measurement of spatial coordinates between two CMMs oppositely located, the following measurement method can be considered. That is, the reference CMM 10 is positioned at a certain location, and a certain shape fixed on the reference CMM 10 as a part for measurement is measured by the probe and the like of the object CMM 20. In accordance with the measurement strategy previously determined, the reference CMM is moved and positioned successively to measure the shape repeatedly at each location, resulting in measured data on geometric deviations that cover everything in the measurement space by the object CMM 20. The object CMM 20 is then calibrated based on the obtained data.

The comparative measurement of spatial coordinates is a method of directly comparing and measuring information on three-flexibility of translations detected at a probe position. Therefore, it can be considered to perform a measurement via a shape where it is dominant. Referring to the publicly known examples, among shapes located on artifacts (artificial products) for use in measurements, many of them are overwhelmingly spheres. It is considered desirable that, when the shape is measured in a particular procedure and as a result of assumption of parameters expressing the shape, a distribution of reliability exhibits almost isotropic. This is because the reliability on the parameters expressing the shape is directly propagated to uncertainty in calibration for the object CMM.

(3) Assumption of Parameters of Spherical Shape

The reliability on measurement of a shape is greatly affected from locations of measurement points and the measurement strategy. When a CMM is employed to measure a sphere, four unknown parameters expressing the shape are assumed. If the variations on every measurement points are known, locations of the measurement points may affect the reliability on the parameters. This influence will be considered below.

Figure 5A:
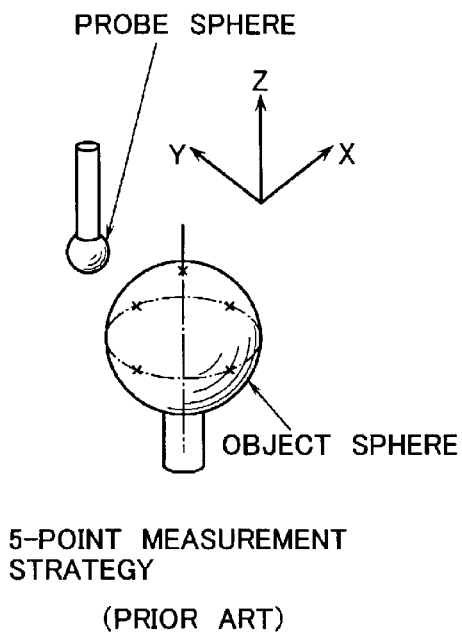
FIGS. 5A and 5B exemplify an arrangement of measurement points and measurement strategy.

In measurement of a sphere, a measurement strategy shown in FIG. 5A is applied in many cases, in which measurement points are located four on the equator and distributed at 90-degree equiangular, and one on the north pole. The five measurement points are employed in the least mean square to assume four parameters that represent central coordinates and a diameter of the sphere. The following equation (1) is an error matrix that describes reliability on the four parameters. In this equation, the computation is performed, using the north-pole direction as the z-direction, in the case where no correlation is present between measurement points when variations in measurements at measurement points are dispersed and the dimensionless number is equal to 1.

$$S_\beta = \begin{bmatrix} 0.5 & 0.0 & 0.0 & 0.0 \\ 0.0 & 0.5 & 0.0 & 0.0 \\ 0.0 & 0.0 & 1.25 & -0.5 \\ 0.0 & 0.0 & -0.5 & 1.0 \end{bmatrix} \quad (1)$$

The equation (1) has diagonal elements, which denote, in turn from the first row on the first column, elements of central coordinates x, y, z and a dispersion of a parameter assumption value representing a diameter. Equal dispersions are obtained in the x- and y-elements of the central coordinates while reliability on the z-directional element is two or more times lower in result. When the three elements of the central coordinates are assumed in this arrangement of measurement points, it is found that the reliability in the z-direction is required to include a margin.

Figure 5B:
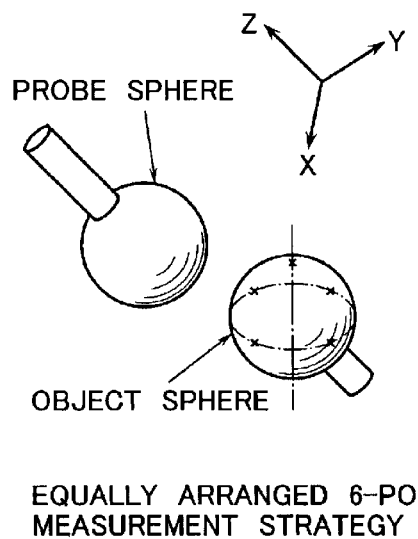

As shown in FIG. 5B, when six points uniformly distributed on the spherical surface are employed as measurement points to assume parameters, an error matrix is obtained as represented by the following equation (2). It provides highly reliable numerical values that are isotropic in x-, y- and z-directions and not correlated with each other. It is found desirable to locate measurement points uniformly from the viewpoint of parameter assumption in the measurement of a sphere. It is also found in this case that variations at one measurement point are dispersed and compressed into ½ and propagated to parameters.

$$S_\beta = \begin{bmatrix} 0.5 & 0.0 & 0.0 & 0.0 \\ 0.0 & 0.5 & 0.0 & 0.0 \\ 0.0 & 0.0 & 0.5 & 0.0 \\ 0.0 & 0.0 & 0.0 & 0.67 \end{bmatrix} \quad (2)$$

In measurement of a spherical shape normally performed in a practical CMM, the diameter of a probe sphere is considerably smaller than that of an object sphere to be measured. Therefore, the stem of the probe sphere interferes with the object sphere and prevents uniform location of measurement points. For example, in measurement of a ball plate on a virtual CMM (Virtual CMM [PTB 1999]) indicated by PTB (German Standard Institute), it is noted that the measurement is performed on a total of five points including four on the equator and one on the north pole of a spherical shape. In this case, the central coordinates of the sphere are assumed in all of the x-, y- and z-directions, though the information on z-direction is treated as information for alignment of the ball plate and is not employed to calibrate the CMM.

The following description is directed to desirable relations between spheres and stems of an object to be measured and a touch probe for ensuring plural measurement points uniformly distributed on the spherical surface of the object sphere.

Figure 6:
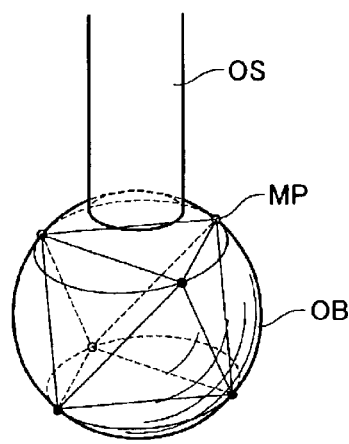
FIG. 6 exemplifies an arrangement of measurement points.

As shown in FIG. 6, the number of measurement points is assumed six. The six measurement points MPs uniformly located on the surface of the object sphere OB form six vertexes of a regular 8-polyhedron as shown in FIG. 6. In this case, to space a stem OS at the farthest point apart from the measurement point MP, it is required to locate each three of the six measurement points MPs in a plane perpendicular to the central axis of the stem OS, respectively, as shown in FIG. 6. In other words, when the central axis of the stem OS is likened to the rotational axis of the earth, three measurement points are each located on the same latitude in the northern hemisphere and the southern hemisphere. These sets of three measurement points form regular triangles, respectively, which are located at 180-degree rotated locations from each other relative to the central axis of the stem OS.

Figure 7A:
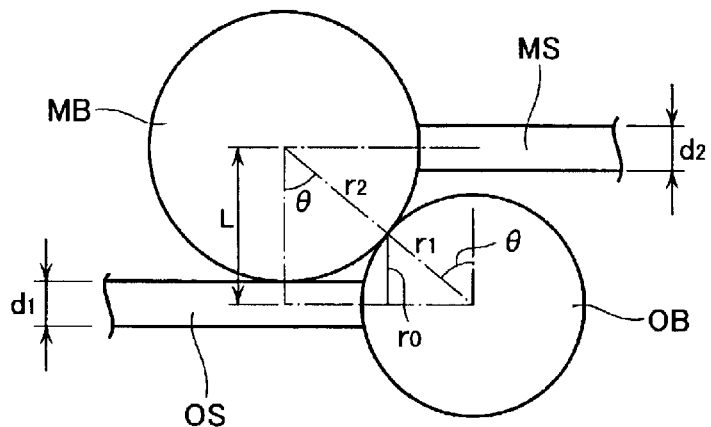
FIGS. 7A and 7B illustrate relations between a size and a measurable range of a sphere on a reference device and of a sphere on a touch probe.
Figure 7B:
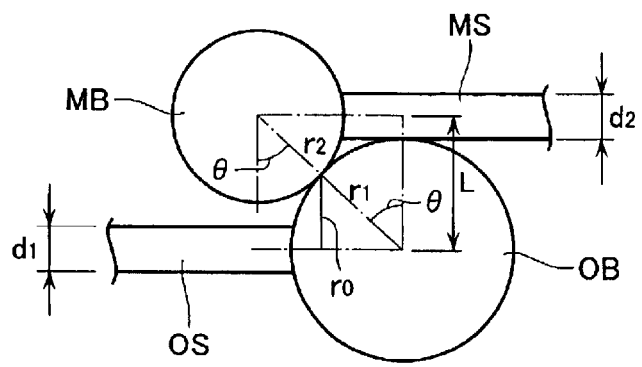

FIG. 7 shows a relation between the touch probe sphere MB and the object sphere OB and a relation between respective stems MS and OS. A condition to keep angles of the stems OS, MS unchanged is herein given to avoid measurement errors as far as possible. The most effective method to prevent the spheres OB, MB from interfering with the stems OS, MS, is to locate the stems OS, MS in parallel and allow them to extend oppositely from the spheres OB, MB. When $r_1$, $r_2$ denote radii of the spheres OB, MB; $d_1$, $d_2$ diameters of the stems OS, MS; and $r_0$ a radius of a circle connecting between points that are touchable to the spheres OB, MB and closest to the stem OS, the following expressions are given:

(a) If $r_1+d_2/2 \leq r_2+d_1/2$, $r_0=(r_2+d_1/2)r_1/(r_1+r_2)$ (3)

(b) If $r_1+d_2/2 > r_2+d_1/2$, $r_0=(r_1+d_2/2)r_1/(r_1+r_2)$ (4)

To contact the sphere MB with six points uniformly located on the spherical surface of the sphere OB, it is required that, as shown in FIG. 6, three points closest to the stem OS are located on a circle, which has a larger radius than $r_0$ in the equations (3), (4).

It is assumed that vertexes of a regular 8-polyhedron inscribe on a sphere and that the north latitudes on three points are equal to the south latitudes on other three points, respectively. The probe spheres OB and MB, having the stems OS and MS oppositely extending, contact with each other at either one of these six points and the stems do not interfere with the spheres in the following condition:

$L=\{(r_1+r_2)/2\} \times \cos\theta$ (5)

If the stems orient to the north pole, the north latitudes and the south latitudes of the six points are each equal to about $\theta=35.264°$. Accordingly, a distance L between two parallel straight lines consisting of the central lines of the two stems is shown below.

In this case, the stems do not interfere with the corresponding spheres in a condition that simultaneously satisfies the following two equations:

(a) $r_2+d_1/2 < L$ (6)

(b) $r_1+d_2/2 < L$ (7)

Except for special cases where the stems OS and MS supporting the spheres OB and MB have relatively large diameters, two spheres OB and MB can contact with each other at six measurement points. Thus, it is possible to make the central coordinates of the assumed spherical shape have reliability isotropic in the x-, y- and z-directions.

The measurement points are not limited to six. The measurement points on the sphere OB can uniformly distribute on the surface of the sphere OB by the number of six or more. Preferably, the contact points locate on vertexes of a regular n-polyhedron ($n \geq 8$).

(4) Geometrical Deviations and Probe Vectors

When a kinematic parametric error is employed to calibrate a geometrical deviation of a CMM, it is required to examine a relation between an amount of the deviation detectable at the tip of the measurement spindle and each parametric error. An application of the comparative measurement method for spatial coordinates is not an exception. This method detects translation deviations in three-dimensional space. Accordingly, the measurement is performed while an angular deviation of the CMM is superimposed as an Abbe error on the translation deviations.

A vector starting from a straight guide mechanism concerned to the tip of the measurement spindle may be called an effective arm length vector. In this case, the translation deviation caused from the angular deviation can be formulated in an outer product between the effective arm length vector and an angular deviation vector to be examined. If the effective arm length vector has a constant length, its measurement contains a certain value of contribution from the angular deviation concerned. For example, when the measurement is performed immediately beneath the z-spindle as shown in FIG. 8A, any probe vector in the z-direction may be given to measure along the z-axis. In this case, an influence, given to the translation deviation from a roll element among angular deviations due to the z-axis, comes to zero. In contrast, formulation of the roll element of the z-axis requires plural results in translation deviations on probe vectors, which are different in the x- or y-direction set as shown in FIGS. 8B and 8C and measured in the z-axis.

A factor that varies the effective arm length vector can be determined depending on the CMM structure and the axes stacking order. For example, in the case of the CMM of which appearance is shown in FIG. 1, a single variable factor on the z-axis is the probe vector as described above. To the contrary, in the case of the y-axis that is farthest from the measurement probe, in addition to the probe vector, coordinate indication values of the x- and z-axes are contained in factors that influence the effective arm length vector. As a result, in order to obtain 21 sets of parametric errors in the orthogonal CMM, it is necessary and sufficient condition to give three different probe vectors not arrayed in line within a three-dimensional space shown in FIG. 9, for example. FIG. 9 shows an example of the reference device 27 that can satisfy such the condition. In this depicted example, the reference device 27 secured on the measurement spindle 26 of the object CMM 20 comprises a support 27d having two arms 150 mm extended from a sphere 27a and 90-degree angled from each other, and two spheres 27b, 27c held on the support 27d. The sphere 27a is located immediately beneath the spindle 26 and the spheres 27b and 27c are located at the arm tips of the support 27d.

(5) Error Compensation in Measurement

In a CMM calibration method executed in the art with reference to a one-dimensional calibration reference, a relatively light reference device such as a step gauge is mounted on a measurement table in a CMM. The whole measurement strategy is composed of a combination of about 30 measurements each consisting of a short measurement time such as about 10 minutes. In this case, a time scale remarked is short and a structural loop from the reference device to the measurement probe of the CMM is almost shortest.

In comparison to this case, in the comparative measurement method for spatial coordinates, a time required for one measurement can be set freely. However, the time is about one hour and is longer compared to the conventional method. In addition, the structural loop from the measurement probe of the reference CMM to the sphere of the object CMM is also longer.

Figure 10A:
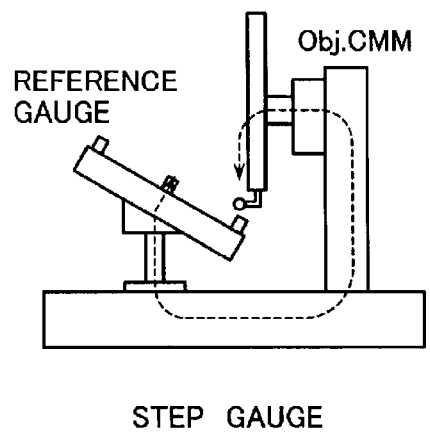
FIGS. 10A and 10B schematically show a calibration method for CMM with reference to a one-dimensional calibration reference and a comparative measurement method for spatial coordinates.
Figure 10B:
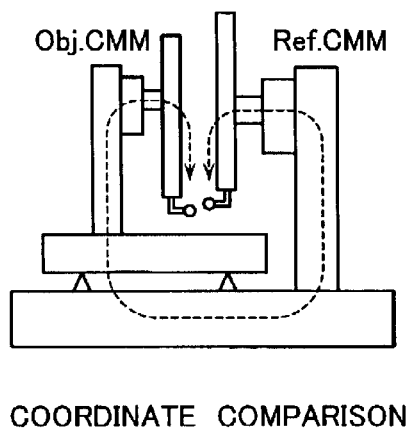

FIG. 10 schematically shows these situations.

In the comparative measurement method for spatial coordinates, there are a large number of systematic error factors obviously appeared along with the measurement. Principal among them are:

(A) Influences from coordinate transformations between CMMs and attitude variations (B) Deviations from positioned and commanded locations of CMM (C) Influences from thermal expansions and environmental temperatures These factors are individually examined for solutions and compensated simultaneously with the comparative measurement for spatial coordinates. The following description is directed to them one by one.

(6) Variations in Coordinate Transformations

Figure 11:
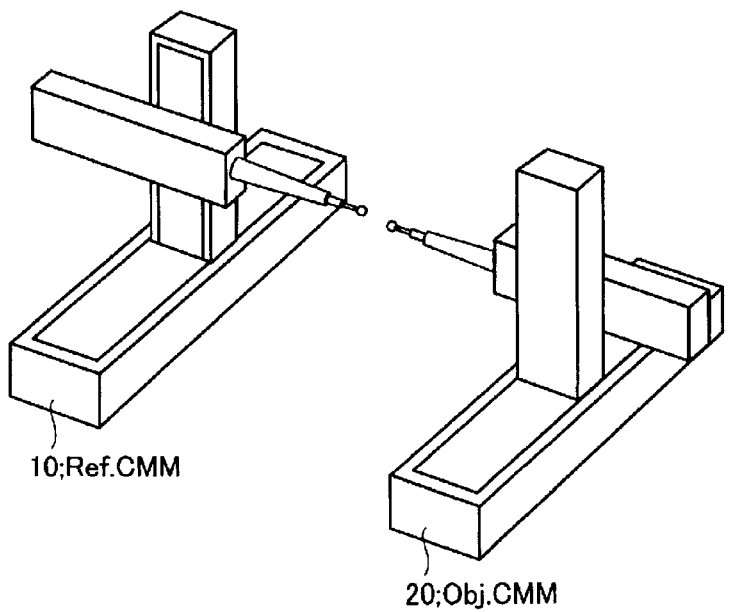
FIG. 11 schematically shows a method of positioning lever type CMMs to determine a positional relation between two CMMs so that the entire mechanical coordinate system of the object CMM can be contained within the mechanical coordinate system of the reference CMM.

CMMs and machine tools are equipped with a coordinate system and the origin in their own mechanics and, according to it, a mechanical coordinate system is present. When two CMMs are directly compared to perform a comparative measurement of spatial coordinates, it is required to determine a positional relation between two CMMs so that the entire of the mechanical coordinate system of the object CMM can be contained within that of the reference CMM. In this respect, cantilever type CMMs can be easily arranged in parallel as schematically shown in FIG. 11.

It can not be performed practically, however, to determine a coordinate transformation between two mechanical coordinate systems by an order of ppm. In general, the cantilever type CMM is directly fastened to and located on the floor for installation. When a mass distribution shifts as the structural member of the CMM moves, an elastic deformation mainly occurred in the vicinity of the fastened portion between the CMM and the floor easily gives a variation by an order of 10 ppm to the coordinate transformation between the mechanical coordinate systems.

To perform a comparative measurement between moving bridge types, the object CMM 20 is mounted on the base of the reference CMM 10 as shown in FIG. 1. The moving bridge CMMs employed are supported and installed on three points at the rear surface of the base as determined in the specification. In this case, the center of weight also moves as the movable section moves like the cantilever type CMM and an elastic deformation in the vicinity of the installation section varies the coordinate transformation in the mechanical coordinate systems by several ppm.

A coordinate transformation between the mechanical coordinate systems in two CMMs can be obtained easily by comparatively measuring three of more coordinate indication values in the vicinity of the center in the measurement space. In order to calibrate the geometrical deviation of the object CMM, it is required to fully move in the measurement space to perform comparative measurements in accordance with the measurement strategy. To detect variation components as the center of weight of the mechanism moves, six channels of differential-transformer type sensors 64 are located as schematically shown in FIG. 12. To detect six-flexibility in a three-dimensional space, channels are located three in the z-direction, two in the z-direction, and one in the z-direction.

Figure 13:
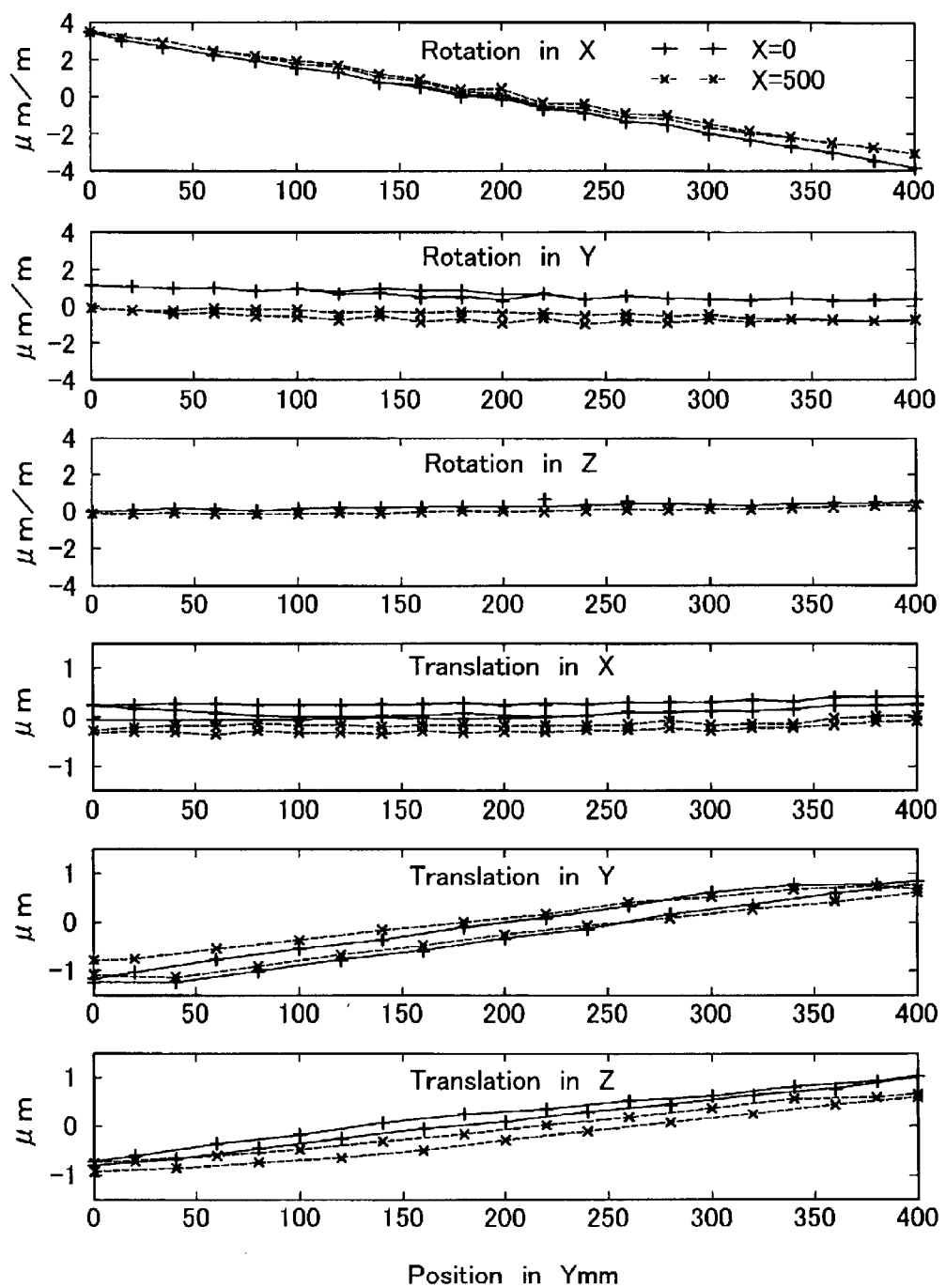
FIG. 13 shows results at a location (0.0, 0.0, 0.0) mm, indicating variable components of coordinate transformation parameters computed from displacement values measured at six locations, on three components of rotation and three components of translation, in the coordinate system of the object CMM in the method of FIG. 12.

It is not easy to assume a relative movement between two CMMs 10 and 20 through intuition from one-dimensional displacements at six locations on which the sensors 64 are located. FIG. 13 shows results at a location, (0.0, 0.0, 0.0) mm, indicated in the coordinate system of the object CMM 20, on variable elements in the coordinate transformation parameters calculated from displacement measured values at six locations, with respect to three rotation elements and three translation elements. From above in the figure, the three rotation elements are indicated around the x-, y- and z-axes and the three translation elements in the x-, y- and z-directions.

The object CMM 20 employed is of the moving bridge type and accordingly it is the y-axis with the heaviest movable section that greatly contributes to the center of weight. An amount of the variation is shown when the y-axis is moved and positioned over the full-stroke. As a movement of the column in the x-axis direction also moves the center of weight to some extent, a measurement was performed also in the x-axis direction following a different positioning. In the figure, the mark (+) and solid line indicates measured values at x=0 mm and the mark (×) and dashed line indicates results at x=500 mm.

It can be found that, in accordance with the location of the object CMM 20 positioned in the y-axis direction, the rotation around the x-axis and the translation along the y-axis mainly vary. It can further be read that other elements also vary to some extent that can not be neglected.

The location positioned in the x-axis direction influences on the rotation around the y-axis and the translation element along the x-axis. In the variation data, an envelope depending on a history of movements of the y-axis can also be observed. These behaviors easily vary on the basis of the contact condition and so forth at three points for supporting the object CMM 20. Therefore, the coordinate transformation between two CMMs is compensated through real time monitoring.

The nominal coordinate transformation, calculated from the coordinate comparison performed with several points at most prior to calibration, can not compute a strict coordinate transformation between two CMMs.

(7) Treatment of Positioning Deviations

Measurement of a spherical shape is performed in the comparative measurement of spatial coordinates while the reference CMM 10 is positioned on a certain location. Therefore, it is ideally desirable that the reference CMM 10 is in a completely stationary state. In practice, however, there are some factors, such as vibrations and a contact force by a probe, that serve as disturbance to a servo system for positioning a CMM controller with a finite gain. This makes it difficult for the reference CMM to be expected always to provide positioning precision almost similar to the resolution of a linear scale. Then, prior to assumption of four parameters that represent a spherical shape, the influences on the positioning deviation are reduced. FIG. 14 shows two-dimensional schematics for description.

In this figure, when four points on the outer circumference of a circle are measured, four measured value coordinates can be obtained each for the reference CMM 10 and for the object CMM. The measured value coordinates of the reference CMM can be expected to focus on one point in an ideal case as shown in FIG. 14A. Therefore, their center of weight is assumed as the central coordinates of the sphere. In this case, deviation vectors from the center of weight to measurement points are obtained as shown in FIG. 14B to compensate the corresponding measurement points by the object CMM 20 using them as shown in FIG. 14C. Finally, the least mean square is employed to assume parameters that represent a circular shape. This process premises such local isotropy that contains no spatial distortions in an order of a length of the deviation vector from the center of weight. According to the measured values, this local isotropy assumption is appropriate because the length of the deviation vector is less than 2 mm.

(8) Influences from Environmental Temperatures

Among installation environments for CMMs, a temperature environment is set at the reference temperature, 20° C., for geometric measurements defined in ISO. Depending on the specification of a real air-conditioner facility and internal heat emission due to the running condition, the temperature of a CMM indicates a deviation from the reference temperature. Generally, structural members of the CMM and members of the linear scale have constant line expansion coefficients and accordingly expand thermally due to the temperature deviations and line expansion coefficients. Thermal behavior of the CMM has been the subject to study for over 30 years while it is frequently compared with that of the machine tool. In the case of CMMs, except for high-speed operative types in part, it can be seemed that internal heat sources are mainly composed of small motors for driving axes. The thermal behavior is different in this respect from that of the machine tool. It is known that the external factors such as air temperatures and emissive heat sources give relatively great influences.

The recent mass productive CMMs reflect such the property on their mechanism designs. Many mechanical designs are achieved so as not to cause any destructive thermal deformation if a quasi-steady temperature variation is equal to about 1° C./hour. When the influence from the thermal expansion is compensated to improve the heat-resistant environment, in the CMM toughly designed against the thermal environment, the mainstream is to correct only a line expansion of a linear scale for each axis. This stands in contrast to the conventional method that employs many environmental sensors and complicated thermal deformation models.

Figure 15A:
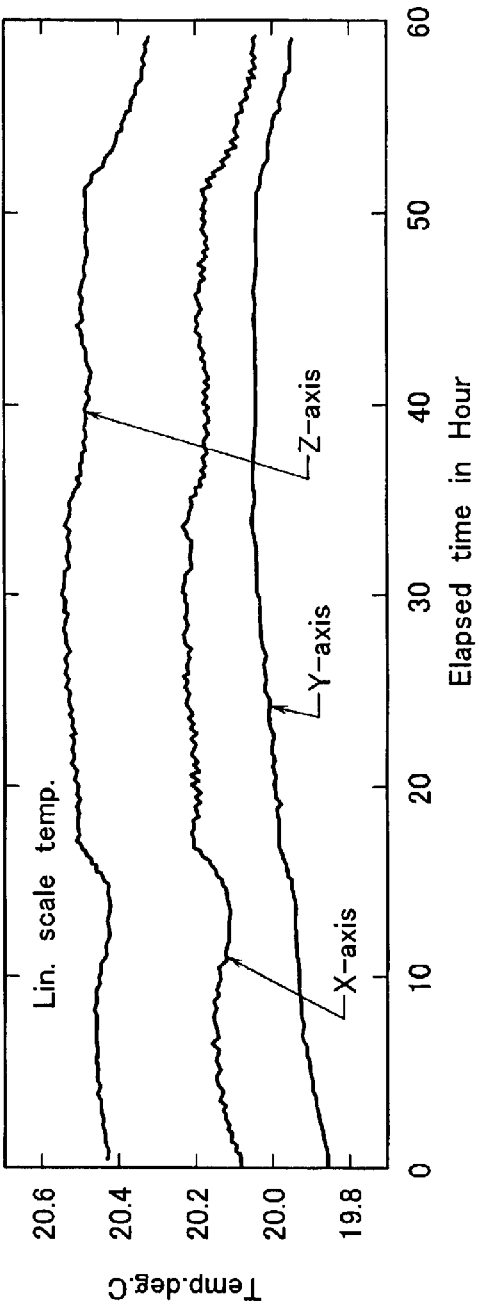
FIGS. 15A and 15B are graphs showing time variations in temperatures on a linear scale.
Figure 15B:
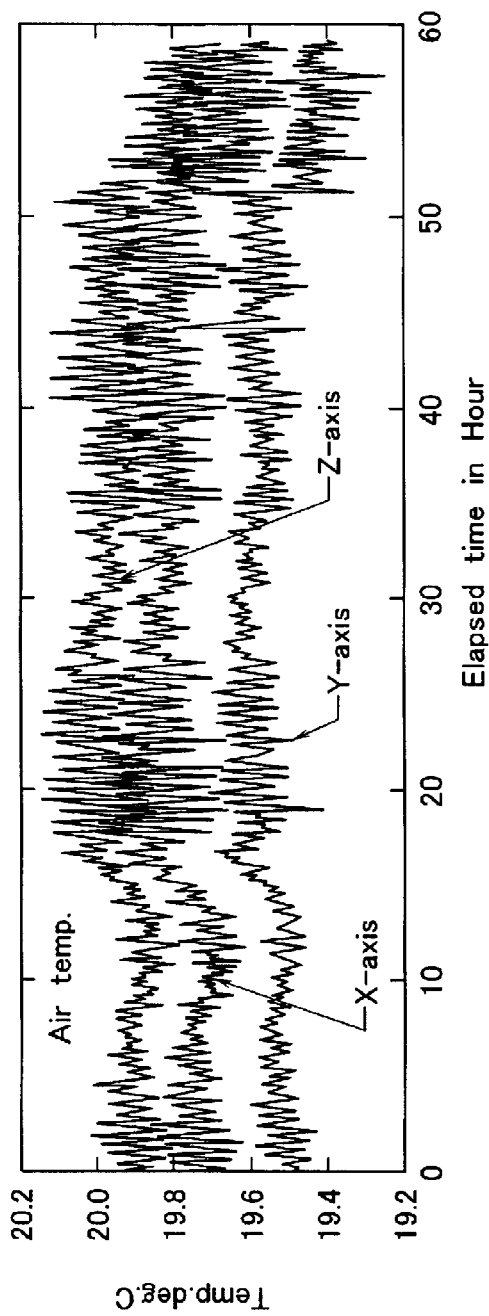

FIG. 15 shows results obtained from measurements of a thermal environment around a prototype calibration system at an installing location. The temperature measurement system employed has an expanded uncertainty of 15 mk (a coverage factor, K=2). The measured value of temperature was sampled once a minute. A small temperature sensor is attached on the center of each axis in a CMM to monitor thermal variations of the CMM. A temperature sensor with a heat sink composed of an aluminum-plate attached thereto is employed to monitor an air temperature around each axis in the CMM. In the installation environment, air conditioning is performed to sweep air in room away in about 10 minutes. Although, any forcible ventilation is not considered particularly around the heat sink, there is sufficient thermal transmission by convection between the air and the heat sink.

The upper part in FIG. 15 shows temperatures on the linear scales for different axes plotted to the lateral time axis. The lower figure plots measured results on air temperatures. These temperature measurements were resulted from a 60-hour continuous record, which reflects influences from disturbances such as differences between days and nights, openings and closings of doors in daytime, and comings and goings of people. It is remarked first that both the airs and the linear scales have such recorded temperatures that elevate in a turn of y-, x- and z-axes. This reference CMM is, when it is traced along a path extending from the floor to the probe tip, composed of in a turn of y-, x- and z-axes. An installation location in the vertical direction of the linear scale for each axis also elevates in this turn. Each installation height is equal to about 0.5 m for the y-axis, 1.8 m for the x-axis and 2.5 m for the z-axis. It is found that the temperature on a linear scale for each axis has a property in accordance with the vertical temperature gradient in the installation environment.

Focusing attention on the temperature variations at respective plots, three air temperatures exhibit almost similar trends on variations. Therefore, it is thought that the air conditioning and so forth cause no local temperature variations in the vicinity of the linear scales at least. The temperatures on the linear scales exhibit a trend as if the measured temperature value on the y-axis has an integration time constant larger than those of two others. This can be explained from the fact that only the y-axis is composed of solid gabbro and the x- and y-axes are composed of hollow ceramics, reflecting thermal time constants of structural members for the surfaces to attach the linear scales. Focusing attention on the maximum temperature deviation during 60 hours, it was less than 0.2 K for the linear scales and less than 0.4 k for the air temperatures.

From the above measured results, a thermal compensation based on the line expansion of the linear scale for each axis is applied to both the reference and object CMMs 10, 20.

A typical compensation of the line expansion of the linear scale is briefly expressed by the equation (8):

$$\Delta X = \int_{X_n}^{X} \alpha(x - X_n)(T_x - 20)\, dx \qquad (8)$$

where

ΔX: A coordinate deviation element due to thermal expansion;

α: A line expansion coefficient of a linear scale;

x: A coordinate indication value;

$X_n$: A coordinate of the neutral point employed to fix a linear scale on a CMM; and $T_x$: A temperature on the scale at the coordinate indication value x.

If a temperature on one linear scale is represented by a measured temperature value at one point, the equation (8) yields the equation (9):

$$\Delta X = \alpha(x-X_n)(T-20) \quad (9)$$

One-channel temperature sensors 61, 62 are attached respectively to linear scales for the reference CMM 10 and the object CMM 20 employed. Outputs from these temperature sensors 61, 62 are employed to perform the compensation by the equation (9) to the indication value on each axis.

Even after the linear scales 19a–19c are compensated in the linear thermal expansions, when the temperatures on the mechanical members of the CMM vary, the neutral points employed for securing the linear scales 19a–19c on the mechanisms may vary themselves in accordance with the temperature variations. An influence from this displacement is observed in many cases as a drift in a series of measured data. The line expansion compensation herein described does not cover the displacement of the neutral point of the linear scale and accordingly it can not be compensated during the measurement. An available solution is to set a time required to acquire a set of measured data sufficiently longer compared to the drift. Another solution is to set the time sufficiently shorter. The former can not be a practical solution in consideration of throughput of the measurement. The latter on the other hand corresponds to the one-dimensional geometric measurement that is performed using an end standard, for example, in the art. In the case of an artifact that has a relatively large number of measurement points, however, it corresponds to neither. As a result, a relatively large drift is likely observed.

A solution available in this case is to determine the number of repetition in a set of measured data to an even number to make front and rear arrangement patterns of measurement points be symmetric about the time axis. This prevents the contribution from the drift that varies straightly to the time axis during parametric error assumption.

Figure 16:
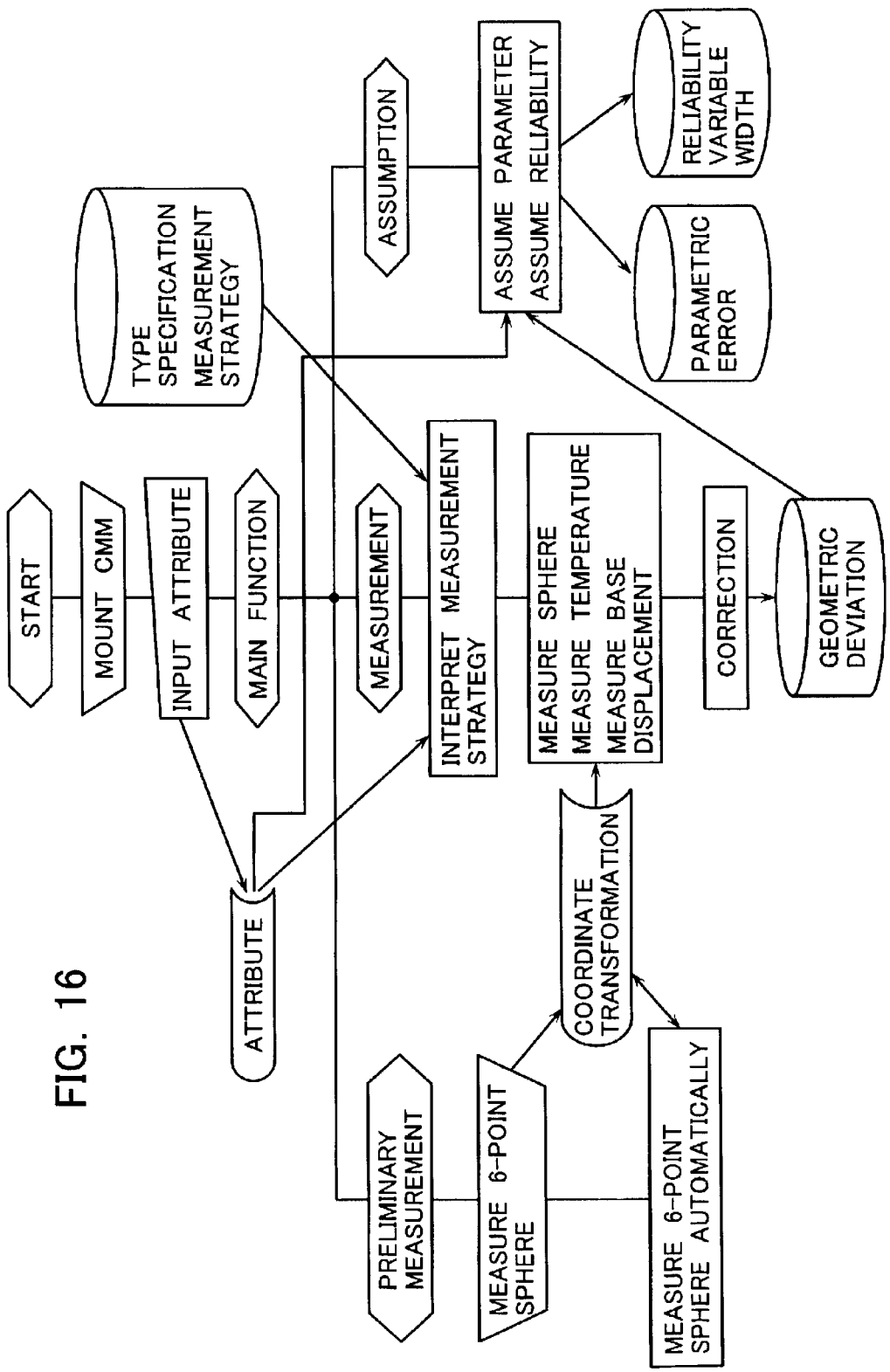
FIG. 16 is a block diagram showing an outline of the calibration method.

The following description is directed to procedures for obtaining parametric errors of the object CMM 20 using the calibration system in this embodiment. Among a series of procedures, main procedures include the next four:

(a) Mounting operation of Object CMM
(b) Preliminary measurement
(c) Comparative measurement of Spatial coordinates
(d) Assumption of Parametric errors and their reliability (9) Mounting Operation of Object CMM In the comparative measurement of spatial coordinates, prior to the beginning of a calibration operation, a manual operation by an operator is required to mount the object CMM 20 on the reference CMM 10 using a crane, for example. Next, a brief preliminary measurement is performed to determine an approximate coordinate transformation between two CMMs. A series of subsequent operations can be completely automated and executed in a computer In "(c) Comparative measurement of Spatial coordinates", a geometric deviation at the tip of the measurement spindle 26 in the object CMM 20 is measured through measurement of a spherical shape. In accordance with the measurement strategy previously determined, after geometric deviations at all measurement points are collected, a measurement model is employed to assume parameter errors of the object CMM 20 and their reliability almost at the same time. A block diagram for outlining such the calibration is shown in FIG. 16.

In the geometrical measurement, it is hard to quantify uncertainty due to the manual operation by the operator. It is possible to completely automate the measurement itself in the comparative measurement of spatial coordinates. Therefore, it is not required to consider the quantification-hard contribution by the manual operation at the time of assumption of uncertainty in calibration. In this respect, the comparative measurement of spatial coordinates has merit on saving in labor. In addition, it also has a characteristic that can easily respond to the recent intensive need for the calibration technologies, which desires to make the uncertainty obvious. The next description is directed to each step following the mounting of the object CMM.

(10) Preliminary Measurement

The operation of mounting the object CMM 20 on the reference CMM 10 is performed manually. In this case, due to the accuracy on the installation operation and the tolerance in outer dimensions of the object CMM 20, the location of the installation varies in an order of mm. The comparative measurement of spatial coordinates is performed through a measurement of a spherical shape. A spherical shape employed in a prototype system has a diameter of 4 mm. To measure the spherical surface without a malfunction, it is required to determine the parameters of a coordinate transformation for describing a relative location between two CMMs 10, 20 with accuracy of about 0.5 mm at most. It is required to perform some preliminary measurement to roughly determine the parameters of the coordinate transformation.

Parameters to be obtained include three translations and three rotations as parameters of the coordinate transformation. In addition, using one of three different probe vectors as the reference, six parameters are obtained for the remaining two relative position vectors, in a total of 12 unknowns. Further, it is required in practice to expect that the object CMM 20 has no calibration history. In this case, it is expected that assembly and adjustment operators have finished adjustment of the mechanism on their responsibility. On occurrence of an adjustment mistake in squareness that can be easily caused, for example, there is a possibility in the comparative measurement of spatial coordinates to arise an accident such as a collision between CMMs. To detect this situation, three parameters of squareness deviations are considered additionally. Thus, three more parameters add in total, resulting in a total of 15 parameters. The preliminary measurement is performed through the following manual operation by the operator using a joystick.

First, four measurement points are set within the coordinate space by the object CMM 20, then the object CMM 20 is positioned in the coordinates successively and measured by the reference CMM 10. In this case, the four points are located in such a manner that, when any three among the four points determine a flat, the remaining one is not present within the flat. Next, while the object CMM 20 is positioned on either one of these measurement locations, three spheres 27a–27c corresponding to three different probe vectors are measured. The above 15 unknowns are assumed from a total of six measured coordinate values as measured preliminary results.

In the preliminary measurement stage, the object CMM 20 is assumed to have no history on calibration. It is sufficient if the parameter calculated according to this premise in the preliminary measurement has so certain precision that any accidents such as a collision do not occur. All subsequent measurement operations are performed with reference to the result from the preliminary measurement. Therefore, it is required to prevent the joystick operation from causing errors to be contained into measured values. After the preliminary measurement, using the calculated parameters such as a coordinate transformation, the same measurement operation as the preliminary measurement is performed through CNC operations in the control of the host PC 30 to confirm the coincidence with the manually measured value. In case of malfunction present in the manually measured value by the joystick, problems such as collisions and failed approaches may possibly occur during the automatic measurement of the six-point spherical shape. If the confirmation measurement is finished without any trouble, it can be determined that the coordinate transformation between CMMs 10 and 20 is calculated to some extent so that the spherical shape can be measured correctly. The calibration system needs an operator to confirm the success or failure of the CNC operation simply during the confirmation measurement, though in the subsequent processes it can be executed in an environment without humans.

(11) Sphere Measurement with Six Points

Figure 17A:
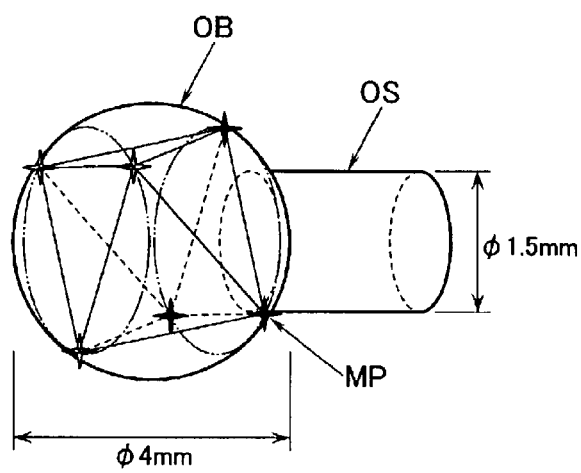
FIGS. 17A and 17B exemplify a sphere on a reference device and an arrangement of measurement points on the sphere.
Figure 17B:
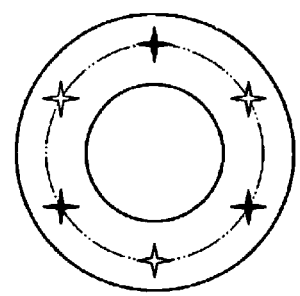

When measurement points are arranged uniformly to measure a spherical shape, these measurement points configure vertexes of a regular polyhedron. In the case of a measurement with six points, they correspond to six vertexes of a regular 8-polyhedron. If the two spheres remarked have no stems for support them and touch signal probes have completely three-dimensional sensitivities, six measurement points can be arranged freely on the spherical surfaces. In practice, it is required to support the probe sphere on the stem with a finite diameter. In the case of the touch signal probe using a Kelvin clamp mechanism can not be applied in a contact force state stretchable along the axis. In the viewpoint of accidents, a contact between the sphere and the stem causes a measured value that can not be distinguished from the normal case. As a solution, an arrangement of measurement points shown in FIG. 17 is employed.

It is assumed that the stem OS orientates the north pole. Three points are arranged on the northern hemisphere and three points on the southern hemisphere, respectively, on the same latitudes. In this case, the maximum margins can be ensured against the problems such as the interference with the stem OS and the insensitive directions of the probe.

In the prototype calibration system, a commercially available ruby sphere stylus was employed. It has a sphere OB with a diameter of 4 mm and the stem with a diameter of 1.5 mm in the specification. When the two spheres contact with each other at contact points (measurement points MP) in FIG. 17, a gap between the stem OS and the sphere OB is equal to 0.5 mm or more, which is sufficient in practice.

In the measurement with the touch signal probe, an error due to the probe is superimposed on a measured value. A non-systematic element is detected along with a variation during the measurement of the sphere. In the comparative measurement of spatial coordinates, the same measurement strategy is employed to measure spherical shapes. A systematic error component due the probe is superimposed as a constant offset value on the central coordinates and diameter of the sphere. In CMM calibration with the spherical shape measurement applied, the systematic error of the probe does not influence on calibrated results.

Through the use of the prototype calibration system, the measurement experiment was performed on one point repeatedly. First, two CMMs are located at the almost center in the measurement range by the object CMM, and six measurement points uniformly located on the spherical surface are employed to measure the spherical shape. After the measurement, both CMMs are sufficiently moved once apart from the measurement location. Through the successive repetition of the above operations, it is possible to extract components observed at random along with the comparative measurement of spatial coordinates and drifts over time under the installation environment.

Figure 18:
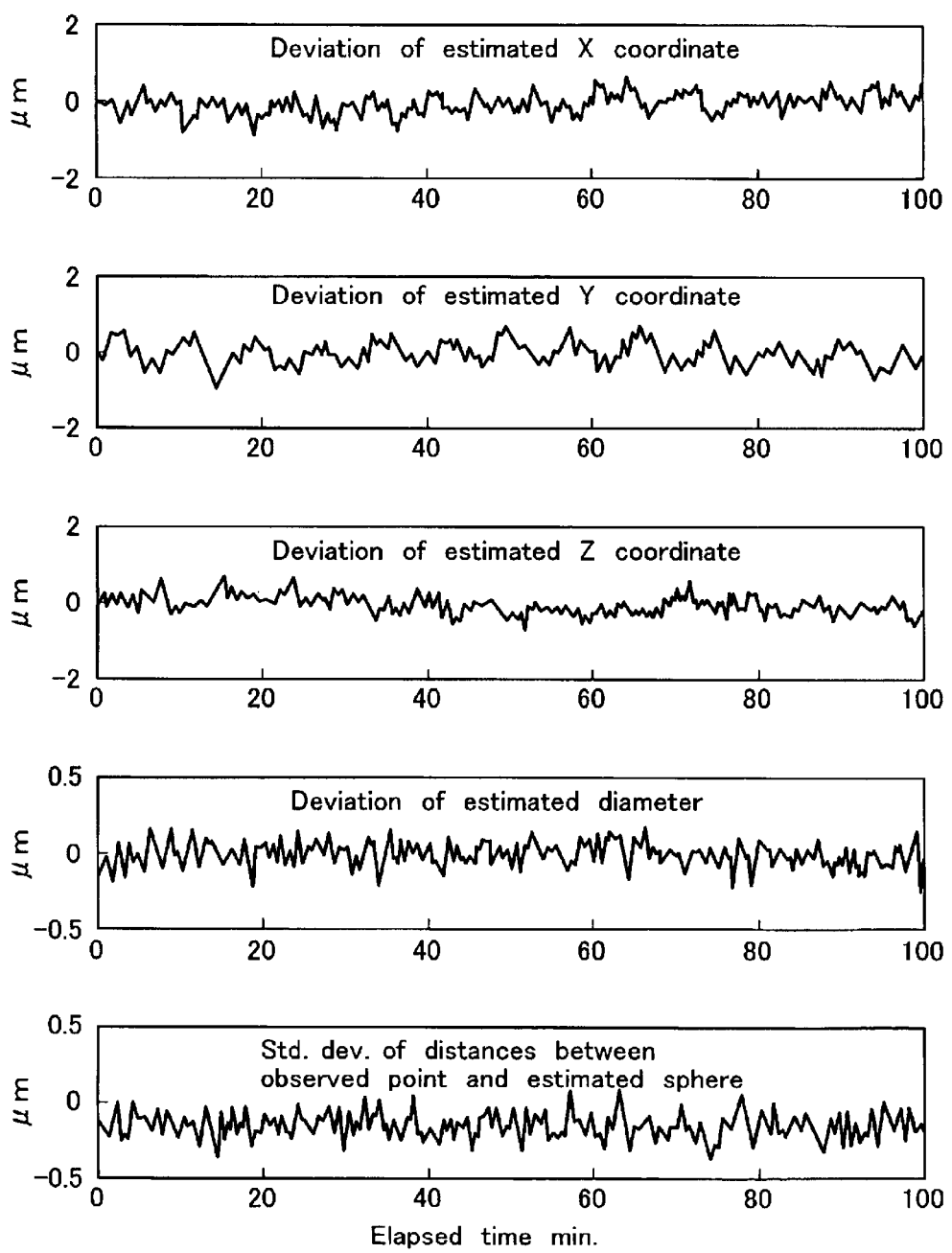
FIG. 18 is a graph showing time transitions of four parameters of the sphere.
Figure 20A:
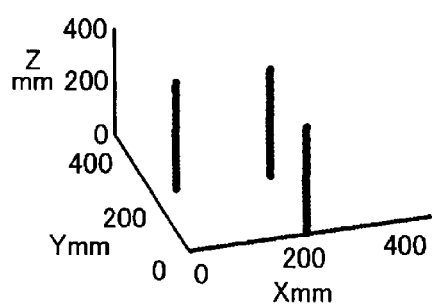
FIGS. 20A–20D show an arrangement example of a measurement strategy for CMM calibration by the comparative measurement for spatial coordinates.
Figure 20B:
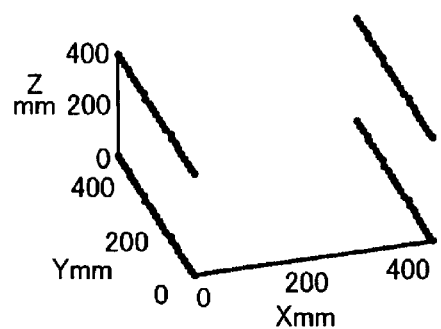
Figure 20C:
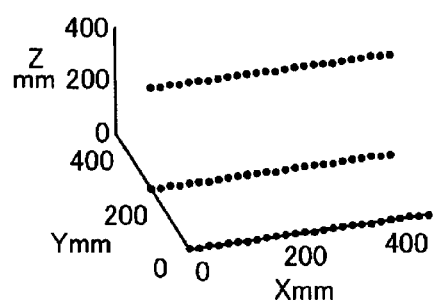
Figure 20D:
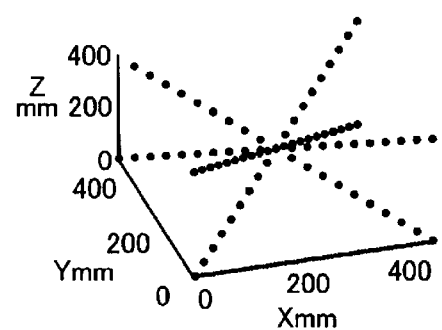

In consideration of a time required for practical calibrations, the repetition condition for measurements was determined to include a time period of 30 seconds for the measurement of the spherical shape and 200 folds of repeated measurements. The least square method is applied to coordinates of six contact points obtained from the measurement to assume a total of four parameters, including the central coordinates and diameter, as measured results. FIG. 18 shows these four parameters plotted along the vertical axis and an elapsed time along the lateral axis. From above in turn, x-, y- and z-coordinate components in the assumed central coordinates and an assumed diameter are shown. Beneath them, distances from the coordinates of contact points to the estimated spherical surface, or the standard deviation of the assumed residue is calculated and plotted together as reference values. The estimated central coordinates are depicted as deviations from the measurement-commanded location of the object CMM, (250, 200, 200) mm, and the estimated diameter as a deviation from an average of the estimated values, 7.999 mm.

From this figure, any remarkable drifts can not be admitted in the estimated parameters during a time of about 100 minutes. The standard deviation of the estimated residue in the case of the 200-fold repetition is equal to 0.3 mm as roughly read from plots on the lower stage. The comparative measurement is performed between two CMMs and in particular the measurement resolution of the object CMM 20 is equal to 0.5 mm. In consideration of those, the repetition of the measurement can be determined sufficient.

Among four parameters, the estimated diameter is calculated as a numerical value that contains all systematic errors, including the stylus sphere of the reference CMM 10 and the stylus sphere of the object CMM 20 as well as the touch signal probe and the signal processing system. Therefore, the estimated diameter has no meaning in its value. On the other hand, with respect to three central coordinates, their numeral values are employed as the data for use in CMM calibration. Therefore, both their estimated values and variations are important factors.

The six measurement points uniformly arranged are employed to repeatedly perform the measurement of spherical shapes. In addition, the four parameters of the sphere are assumed to experimentally indicate the basic repetition of the prototype calibration system. As a result, the sufficient repetition for calibration on the object CMM 20 and the stability over time were confirmed.

(12) Measurement Strategy

When the parametric errors of a CMM are assumed, reliability in the assumed value is strongly influenced from precision of the measurement method employed as well as a degree of the measurement strategy. The measurement strategy has been constructed based on the experienced know-how. There has been no report that states a measurement strategy constructed in accordance with a quantified guideline.

Figure 19:
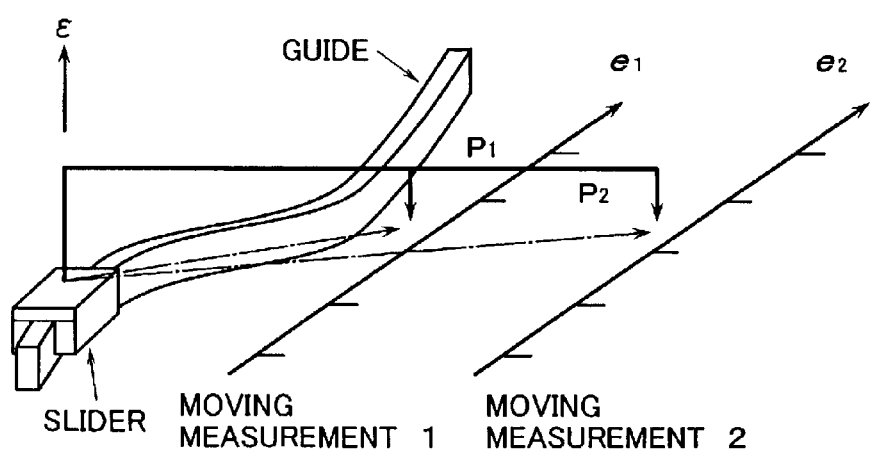
FIG. 19 illustrates a yawing error in a one-axial guide mechanism.

In simulation of a six-flexibility model, it is known that plural combinations of effective arm lengths as long as possible can improve a numerical condition in the case of evaluation of angular deviations using information on translations. This is because, as shown in the equation (10), when the effective arm lengths and angular deviations are treated as (position) vectors, their outer products describe contributions to translation deviations corresponding to the Abbe errors.

$$\delta x = e + \epsilon \times \rho \quad (10)$$

where $\delta x$: A translation deviation observed at a probe location e: A translation deviation corresponding to an Abbe error
ε: An angular deviation
p: A position vector with an effective arm length This is schematically shown in FIG. 19 holding for yawing of a simple one-axis guide mechanism. A yawing parameter can be assumed from measured values of indication deviations in the guide moving directions obtained at two difference locations. Corresponding to the equation (10), the longer the distance between two measurement lines, the more the condition can be improved. In the case of the orthogonal CMM having a cubic measurement space, if measurements of translation deviations along ridges at both ends of the movable range are combined, a response optimal to the angular deviation parameter can be obtained.

On the other hand, the numerical condition for assuming translation deviation parameters in the measurement of translation deviations does not depend on the arrangement of the measurement points. Reliability on the assumed value is determined from the precision and number of the measurement points. If the measurement points are located uniformly in the form of a grid within the measurement space, for example, there is an effect to reduce the dispersion of the translation deviation parameters but little meaning to contribute to the angular deviation parameters.

Depending on the CMM mechanism and the remarked parametric error, an alternation of the probe vector may be required occasionally to vary the effective arm length. In this instance, it may be not possible to extend the probe vector extremely longer, for example, than 200 mm in many cases from restrictions such as mechanical stiffness. There is a limitation to improve the numerical condition of the assumption of the angular deviation parameter based on the effective arm length.

FIG. 20 shows an example of the measurement strategy for CMM calibration by the comparative measurement of spatial coordinates configured based on the result briefly examined above. In this measurement strategy, an array of points equally arrayed on a straight line at an interval of 20 mm is employed as a basic unit and a combination of plural units is mainly employed to assemble the measurement strategy. As described above, it is required to set protrusions of three probes not arrayed in line to assume several parametric errors. A protrusion of 150 mm is herein set in accordance with FIG. 9 using a special tool.

The comparative measurement of spatial coordinates has a high flexibility in arrangement of measurement points. For example, all measurement points can be treated as a set of observed values. Alternatively, an array of points in line may also be divided into and treated individually as each set of observed values. Depending on a measurement model employed, each individual observed value may contain an unknown parameter that represents an inherent alignment. Therefore, it is desirable in the viewpoint of the parameter assumption that observed values are summarized as much as possible. On the other hand, as a practical CMM calibration is performed under an environment, particularly a temperature environment, with a limited stability, a determination on an extent to divide observed values is performed depending on the environmental condition. In consideration of the result from the repeated measurement of the spherical shape with six points as described in the previous section, the measurement strategy was divided into four. Through the only use of observed values on about 300 points contained in this measurement strategy, 21 sets of parametric errors are estimated at the same time.

Next, a second embodiment according to the present invention is described.

Figure 21:
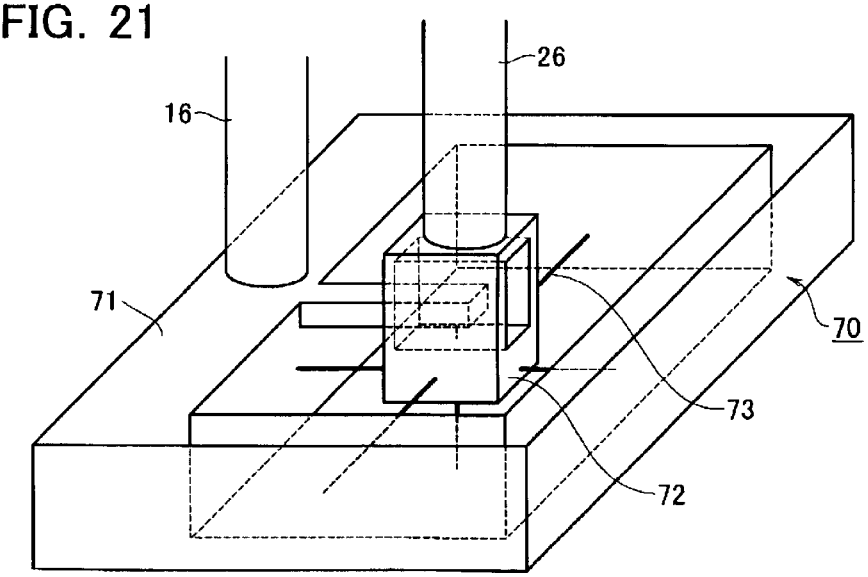
FIG. 21 is a perspective view according to a second embodiment of the present invention showing in part a coupler in the calibration system capable of directly comparing and measuring coordinate indication values from two CMMs.

In the first embodiment, the touch probe 17 is provided on the tip of the z-axis spindle 16 in the reference CMM 10 to measure the spheres 27a–27c provided on the tip of the z-axis spindle 26 in the object CMM 20 and obtain both spatial coordinates for comparison. In the second embodiment, as shown in FIG. 21, a coupler 70 is employed to couple the tip of the z-axis spindle 16 in the reference CMM 10 to the tip of the z-axis spindle 26 in the object CMM 20. This allows both sliders (the z-axis spindles 16, 26) to move simultaneously. Relative to the spatial coordinated by the reference CMM 10, the spatial coordinated by the object CMM 20 can be sampled directly by 1:1.

The object CMM 20 is mounted on the reference CMM 10 like the first embodiment. The object CMM 20 may be a manual CMM that is not equipped with an axial drive mechanism. Alternatively, it may be a CMM that is equipped with an axial drive mechanism, which is released to make each axis free, however. In these cases, the reference CMM 10 is driven to drive the object CMM 20 via the coupler 70. As both the z-axis spindles 16 and 26 are coupled to each other via the coupler 70, the reference CMM 10 and the object CMM 20 spatially keep a relatively constant positional relation. Accordingly, both spatial coordinates are sampled simultaneously at the same time while the spindles 16 and 26 move. Alternatively, the spatial coordinates may be sampled when they stop. As a result, it is possible to directly acquire the spatial coordinates of the reference CMM 10 and the object CMM 20 kept in a constant positional relation.

In this case, the reference CMM 10 and the object CMM 20 have respective geometric deviations (for example, pitching, rolling and yawing). Therefore, both spindles 16, 26 can not be coupled fixedly to each other. Then, the coupler 70 shown in FIG. 21 is employed. The coupler 70 comprises a reference coupling member 71 secured on the spindle 16 of the reference CMM 10 and an object coupling member 72 secured on the spindle 26 of the object CMM 20. Both members 71, 72 are fastened via piano wires 73 each towing in a respective axial direction. Accordingly, the reference coupling member 71 and the object coupling member 72 have no flexibility on movements in the x-, y- and z-axes but have flexibility on relative rotations between them. Therefore, if a geometric deviation is present on each axis in the object CMM 20, for example, the reference CMM 10 and the object CMM 20 can be coupled to each other unforcedly.

Figure 22:
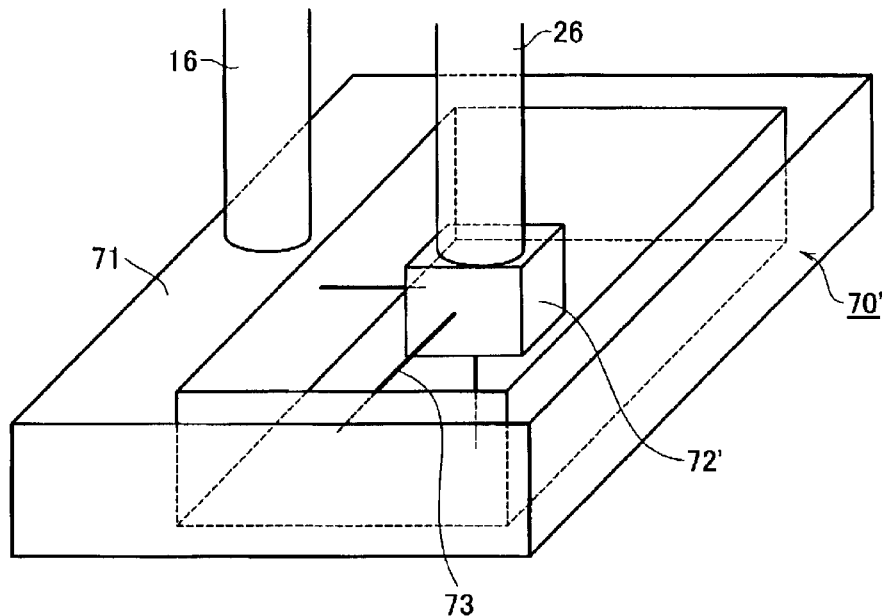
FIG. 22 is a perspective view of a calibration system using another coupler.

FIG. 22 shows an alternative embodiment of the coupler. The coupler 70 shown in FIG. 21 employs the piano wires 73 to couple positive and negative directions of each axis while this coupler 70' comprises the piano wires 73 only in either of the positive and negative directions. In such the one side-only coupling, the spindle 16 or 26 can not be driven in the direction for pushing the piano wire 73, resulting in one-directional driving per axis. Therefore, it is required to provide one or plural compressible spring(s), not depicted, in parallel with the piano wire 73 to drive the spindle also in the direction for pushing the piano wire 73.

Also in the second embodiment, similar to the first embodiment, in accordance with the block diagram of FIG. 16, using the measurement strategy previously determined, the geometric deviations at all measurement points are collected. Thereafter, using the publicly known measurement model, the parametric errors and their reliability can be calculated and assumed almost at the same time.

Figure 23:
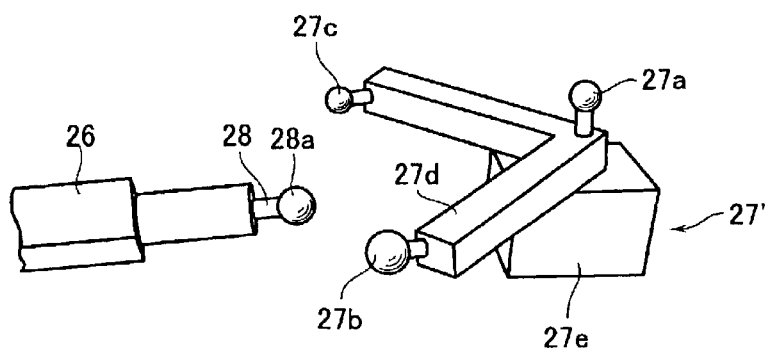
FIG. 23 is a perspective view according to a third embodiment of the present invention showing the main part of a calibration system in a measuring machine.

FIG. 23 is a perspective view according to a third embodiment of the present invention showing the main part of a calibration system in a measuring machine.

In this embodiment, a touch probe attached on the object CMM 20 is employed to measure spherical shapes of three spheres 27a, 27b, 27c of a reference device 27' located on the base plate 21. The reference device 27' comprises a support 27d having two arms 90-degree angled to each other, a support block 27e for keeping the support 27d, and three spheres 27a–27c held on the support 27d. The touch probe 28 is equipped at the tip with a sphere 28a having the same diameter as those of the spheres 27a–27c. The sphere 28a has six or more contact points, which contact with the spheres 27a–27c respectively and distribute uniformly over the surfaces of the spheres 27a–27c. Preferably, the contact points are located on vertexes of a regular n-polyhedron ($n \geq 8$).

Also in this case, the central locations of the spheres 27a–27c can be assumed precisely.

Having described the preferred embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

For example, in the above embodiments, the reference measuring machine and the object measuring machine are limited for description in the three-dimensional coordinate measuring machine. A surface texture measuring machine such as a contour shape measuring machine and an image measuring machine may be employed as the reference measuring machine or the object measuring machine. Further, a straightness measuring machine only with a one-axial guide mechanism may also be employed.

In the measurement for practical calibration, a manual operation may be employed in positioning to a measurement point on each axis. Alternatively, a program may be employed in the reference measuring machine to perform automatic positioning for execution of automatic measurements.

Further, a program may be employed in the object measuring machine to perform automatic positioning for execution of automatic measurements.

As obvious from the forgoing, the comparison of spatial coordinates between the reference measuring machine and the object measuring machine makes it easy to collect geometric deviations of the object measuring machine, calculate and estimate the parametric errors and their reliability almost at the same time.

What is claimed is:

1. A method of calibrating measuring machines, comprising the steps of:

positioning a reference device having a sphere supported on a support member within a measurement space by an object three-dimensional measuring machine having a spherical probe;

contacting said spherical probe with six or more measurement points uniformly distributed on the spherical surface of said sphere to measure central coordinates of said sphere of said reference device by said object three-dimensional measuring machine; and calibrating said object three-dimensional measuring machine based on said central coordinates obtained.

2. The method of calibrating measuring machines according to claim 1, wherein said measurement points distributed on the spherical surface of said sphere locate on vertexes of a regular n-polyhedron (where $n \geq 8$) inscribed in said sphere.

3. The method of calibrating measuring machines according to claim 1, wherein said reference device includes three spheres supported on said support member and not arrayed in line.

4. The method of calibrating measuring machines according to claim 1, wherein said sphere has a diameter almost similar to that of said probe.

5. A method of calibrating measuring machines, comprising the steps of:

positioning a reference three-dimensional measuring machine having a first probing system previously calibrated and an object three-dimensional measuring machine having a second probing system to be calibrated in such a manner that a measurement space by said three-dimensional reference measuring machine is superimposed on a measurement space by said object three-dimensional measuring machine, locating a spherical probe on one of said first and second probing systems and locating a reference device having a sphere on the other of said first and second probing systems;

contacting said spherical probe with six or more measurement points uniformly distributed on the spherical surface of said sphere of said reference device to acquire first measurement values by said reference three-dimensional measuring machine and second measurement values by said object three-dimensional measuring machine; and calibrating said object three-dimensional measuring machine based on said first and second measurement values.

\* \* \* \* \*